(12) United States Patent
Fraundorfer et al.

(10) Patent No.: US 8,571,168 B2
(45) Date of Patent: Oct. 29, 2013

(54) FUEL ELEMENT FOR A LIGHT WATER REACTOR, AND METHOD FOR REPAIRING THE FUEL ELEMENT

(75) Inventors: Franz Josef Fraundorfer, Hessdorf (DE); Gregor Münsterjohann, Neunkirchen am Brand (DE); Erhard Friedrich, Eckental (DE)

(73) Assignee: Areva GmbH, Erlangen (DE)

( * ) Notice: Subject to any disclaimer, the term of this patent is extended or adjusted under 35 U.S.C. 154(b) by 975 days.

(21) Appl. No.: 11/848,394

(22) Filed: Aug. 31, 2007

(65) Prior Publication Data

US 2008/0056428 A1 Mar. 6, 2008

(30) Foreign Application Priority Data

Aug. 31, 2006 (DE) .................... 10 2006 040 965

(51) Int. Cl.
*G21C 3/34* (2006.01)
(52) U.S. Cl.
USPC ........... 376/438; 376/409; 376/426; 376/434; 376/462
(58) Field of Classification Search
USPC ................. 376/438, 441, 442, 446, 449, 462; 411/45, 46, 47, 48, 508, 509, 510, 913
See application file for complete search history.

(56) References Cited

U.S. PATENT DOCUMENTS

| | | | | |
|---|---|---|---|---|
| 4,155,807 A | * | 5/1979 | Schreiber et al. | 376/438 |
| 4,405,272 A | * | 9/1983 | Wollar | 411/41 |
| 4,786,225 A | * | 11/1988 | Poe et al. | 411/32 |
| 4,988,474 A | * | 1/1991 | Hoffmann et al. | 376/261 |
| 5,580,203 A | * | 12/1996 | Read et al. | 411/508 |
| 5,625,657 A | * | 4/1997 | Gallacher | 376/261 |

FOREIGN PATENT DOCUMENTS

| | | |
|---|---|---|
| EP | 0 493 259 A1 | 7/1992 |
| EP | 0 735 543 A1 | 10/1996 |
| FR | 2 633 436 | 12/1989 |
| FR | 2 833 399 | 6/2003 |

OTHER PUBLICATIONS

Knecht et al.: "New techniques for investigations and reconstitution of fuel elements", Kerntechnik 56, No. 2, pp. 68-71, Apr. 1991.

* cited by examiner

*Primary Examiner* — Jack W Keith
*Assistant Examiner* — Marshall O'Connor
(74) *Attorney, Agent, or Firm* — Laurence A. Greenberg; Werner H. Stemer; Ralph E. Locher

(57) ABSTRACT

A fuel assembly for a light water reactor contains a fuel rod cluster and a spacer that has a number of cells, bounded by webs for laterally holding fuel rods. A damaged region including at least one damaged cell is present in an edge region of a spacer. There being fastened above or below the damaged region on the spacer with the aid of at least one connecting part is a replacement assembly that contains at least a number of cells that corresponds to the number of the damaged cells, at least a portion of the cells being traversed by fuel rods. A method for repairing the light water reactor fuel assembly in the case of which fixed above or below the damaged region on the spacer is a replacement assembly that takes over the holding function at least of one defective cell.

10 Claims, 10 Drawing Sheets

FUEL ELEMENT FOR A LIGHT WATER REACTOR, AND METHOD FOR REPAIRING THE FUEL ELEMENT

CROSS-REFERENCE TO RELATED APPLICATION

This application claims the priority, under 35 U.S.C. §119, of German application DE 10 2006 040 965.5, filed Aug. 31, 2006; the prior application is herewith incorporated by reference in its entirety.

BACKGROUND OF THE INVENTION

Field of the Invention

The invention relates to a fuel assembly for a light water reactor, and a method for repairing such a fuel assembly.

In addition to a fuel rod cluster and control rods, a fuel assembly for a light water reactor includes spacers disposed at an axial distance from one another. A spacer includes a multiplicity of cells that are, for example, formed by crossed webs, as well as outer webs bounding it. The fuel rods traverse the cells of the spacers and are thus held laterally. When the reactor core is being charged with fuel assemblies or when the latter are being removed from the reactor core, the problem arises that spacers can be damaged by mutually engaging behind their outer webs or by collision with the upper edge of a fuel assembly channel in the region of the edge-side cells. Edge-side cells are to be understood as cells that directly border an outer web or are adjacent thereto in the second row. When the lateral holding of individual damaged cells of traversing fuel rods is no longer adequately ensured in such an affected damaged area, it is at best possible to make subsequent use of their fuel assembly after an extremely complicated exchange of the spacer.

Published, European patent application EP 0 735 543 A1, corresponding to U.S. Pat. No. 5,625,657, discloses a method for repairing a spacer, in the case of which there is disposed below a damaged region of the spacer a repair grid that has at least a number of replacement cells that corresponds to the number of the damaged cells of the spacer and in which case at least a portion of the replacement cells is traversed by fuel rods.

SUMMARY OF THE INVENTION

It is accordingly an object of the invention to provide a fuel assembly for a light water reactor, and a method for repairing the fuel assembly which overcome the above-mentioned disadvantages of the prior art methods and devices of this general type, which is functional without restriction despite damage to individual cells of a spacer, and to specify a method for repairing a damaged fuel assembly that can be carried out with low outlay.

With the foregoing and other objects in view there is provided, in accordance with the invention, a fuel assembly for a light water reactor. The fuel assembly contains a fuel rod cluster having fuel rods and a spacer having webs defining a number of cells for laterally holding the fuel rods. The spacer further includes an edge region having a damaged region with at least one damaged cell. A replacement assembly is fastened above or below, the damaged region of the spacer having the at least one damaged cell, with an aid of at least one connecting part. The replacement assembly has webs defining a number of replacement cells corresponding to a number of the damaged cells. At least a portion of the damaged cells are traversed by the fuel rods.

With reference to the installed state in a nuclear reactor, in the case of the inventive fuel assembly there is fastened above or below the damaged region on the spacer with the aid of a connecting part a replacement assembly that contains at least a number of cells that correspond to the number of the damaged cells, at least a portion of these cells being traversed by fuel rods. Here, with reference to the central longitudinal axis of the fuel assembly, a damaged cell of the spacer is respectively axially adjacent to an intact cell of the replacement assembly that takes over the lateral holding of a fuel rod axially traversing the two cells. It is advantageous that an affected fuel assembly need not be completely dismantled in order to exchange a defective spacer. Rather, it suffices merely to remove from the fuel rod cluster the fuel rods that traverse the damaged region. After the replacement assembly has been fixed, the removed fuel rods can be reinserted into the fuel rod cluster, at least as regards the uppermost spacer (see below for more details on this). A replacement assembly can be, for example, produced in a simple way by separating a suitable subregion from a spacer of the same configuration.

In a preferred embodiment, the connection between the spacer and connecting part is configured as a snap connection. Apart from a relative joining movement of the parts to be interconnected, such a connection requires no further measures and so it can be produced without any problem by a manipulator normally present in the fuel cooling installation. It is true that the restrictions occurring in the case of underwater assembly do not exist for fixing the connecting part on the replacement assembly. Nevertheless, a snap connection can be expedient, for example, when the replacement assembly is a subregion of a spacer of the same configuration. Specifically, the connecting assembly can then be fixed in a simple way on the replacement assembly and, in particular without modifications to the construction thereof, and, moreover, in the same way as on the damaged spacer.

A snap connection is preferably formed by virtue of the fact that present on a connecting part are axially extending—with reference to the central longitudinal axis of the connecting part—spring tongues that respectively penetrate a cell of the spacer or of the replacement assembly and bear at their free end protruding from the cell a latching projection that engages with a radial shoulder behind the end edge, facing the latching projection, of a spacer or replacement assembly web. As a rule, there is sufficient space available on the end edge of a spacer web such that a connecting part of the type under discussion is suitable for repairing a multiplicity of different configurations of spacers. In order to achieve a reliable mutual axial fixing of the spacer and/or the replacement assembly and connecting part, it is provided, in a further preferred variant embodiment, that present on the connecting part at an axial distance corresponding to the height of a web is a stop surface that engages behind the end edge, averted from the latching projection, of a web. In this case, the stop is formed from an end surface extending at right angles to the central longitudinal axis of the fuel assembly, of a spacer piece of the connecting part, the spring tongues preferably being formed on the end surface.

A defined lateral holding of the connecting part in a cell is preferably accomplished by virtue of the fact that at least two stop surfaces that interact with diametrically opposite regions of the cell and are adapted to the cell shape, are present on the connecting part. In the case of an angular cell, the stop surfaces are of complementary configuration relative to the corner region of a cell, a rotational fixing simultaneously being achieved. In the case of a connecting part having spring tongues, the stop surfaces are preferably disposed on the latching projections of the spring tongues and/or on the base of the spring tongues. In order to facilitate an introduction of the spring tongues into a damaged or intact cell of a spacer or of a replacement assembly, carried out with the aid of a manipulator, the latching projections have insertion bevels interacting with an end edge of a web.

For the purpose of fastening on a spacer having angular cells, it is advantageous to embody a connecting part in the case of which at least one spring tongue is present that penetrates the cell in a corner region, that is to say, in a region of the cell that is not required for holding a fuel rod, for example for fitting springs that are applied to the fuel rod. The configuration is particularly advantageous when, as in the case of a preferred variant embodiment, the connecting part or the distance piece thereof does not have projected a central opening through which a fuel rod or a dummy fuel rod passes. In addition, the arrangement of the spring tongues also results in fixing the connecting part on the spacer in a rotationally fixed fashion. Owing to the fact that a connecting piece is traversed by a fuel rod or a dummy fuel rod, fluid flow conditions are created that correspond approximately to those of the original fuel assembly. However, this differs from the thermohydraulic conditions in a fuel rod region embraced by a connecting part. Because of the connecting part penetrating a cell of the replacement assembly, there is no longer any free flow cross section present there and so adequate cooling would no longer be ensured. Consequently, in these cases a dummy fuel rod is used instead of a fuel rod, for example, the original fuel rod. In the case of an upper spacer (in the installed state) holding fuel rods in the region of their plenum free from fuel, it is possible, by contrast to use the original fuel rod, or else another one. For the purpose of laterally holding a fuel rod or a dummy fuel rod traversing a connecting part, the inner sides, facing the central longitudinal axis of the connecting part, of the spring tongues are configured in a complementary fashion to the lateral surface of a fuel rod or a dummy fuel rod.

The object named at the beginning with regard to a repair method is achieved by virtue of the fact that fixed above or below (with reference to the installed state) on a side of the damaged region, pointing in the direction of the central longitudinal axis of the fuel assembly, with the aid of a connecting assembly on the spacer is a replacement assembly that takes over the holding function of at least one defective cell. The advantages resulting therefrom and from the further method subclaims have already been addressed in part in conjunction with the explanation of the fuel assembly.

Other features which are considered as characteristic for the invention are set forth in the appended claims.

Although the invention is illustrated and described herein as embodied in a fuel assembly for a light water reactor, and a method for repairing the fuel assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
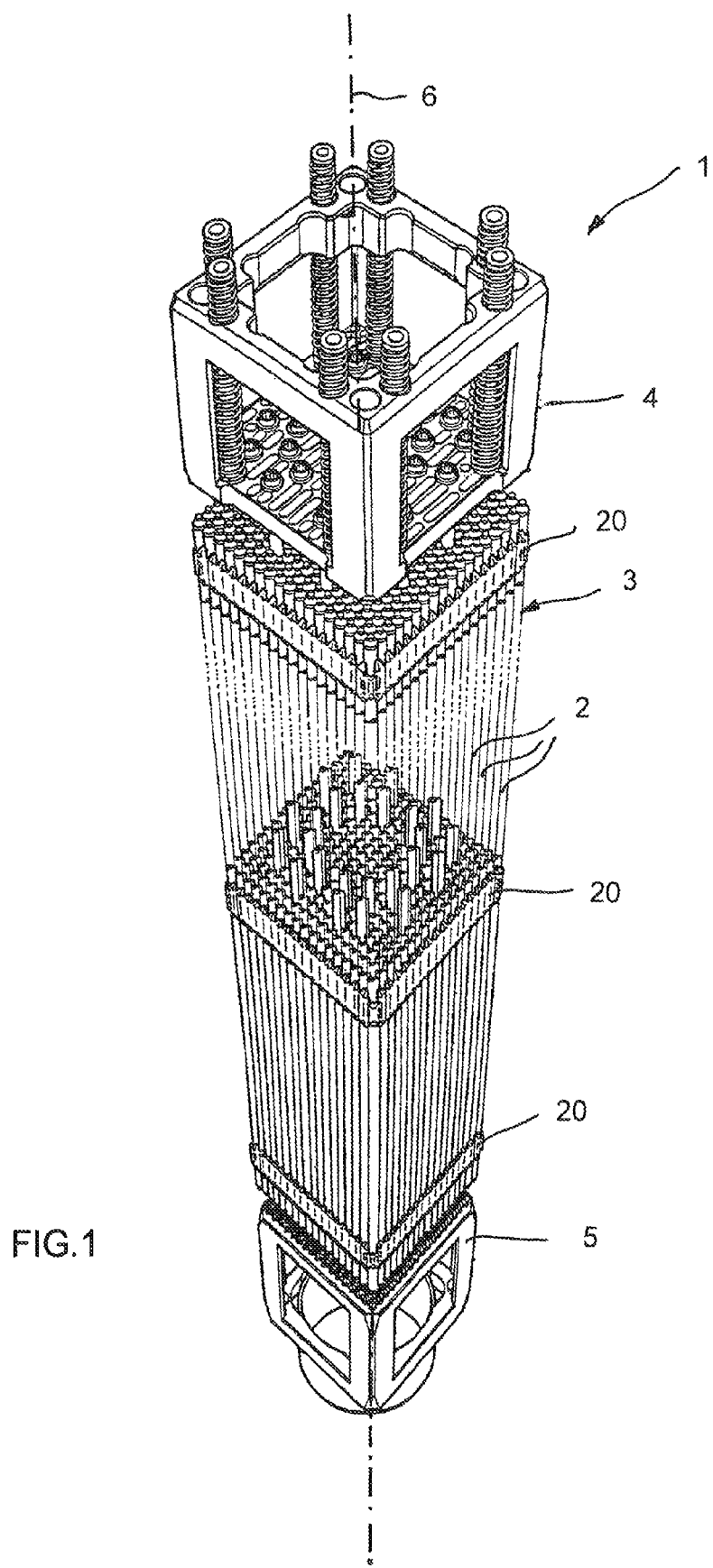
FIG. 1 is a diagrammatic, perspective view of a fuel assembly of a pressurized water reactor.

Referring now to the figures of the drawing in detail and first, particularly, to FIG. 1 thereof, there is shown a fuel assembly 1 of a light water reactor, specifically a pressurized water reactor. The fuel assembly 1 contains a fuel rod cluster 3 formed from a multiplicity of fuel rods 2, a fuel assembly head 4, a fuel assembly foot 5 and a number of spacers 20 that laterally hold the fuel rods 2 and extend transverse to a central longitudinal axis 6 of the fuel assembly 1.

Figure 2:
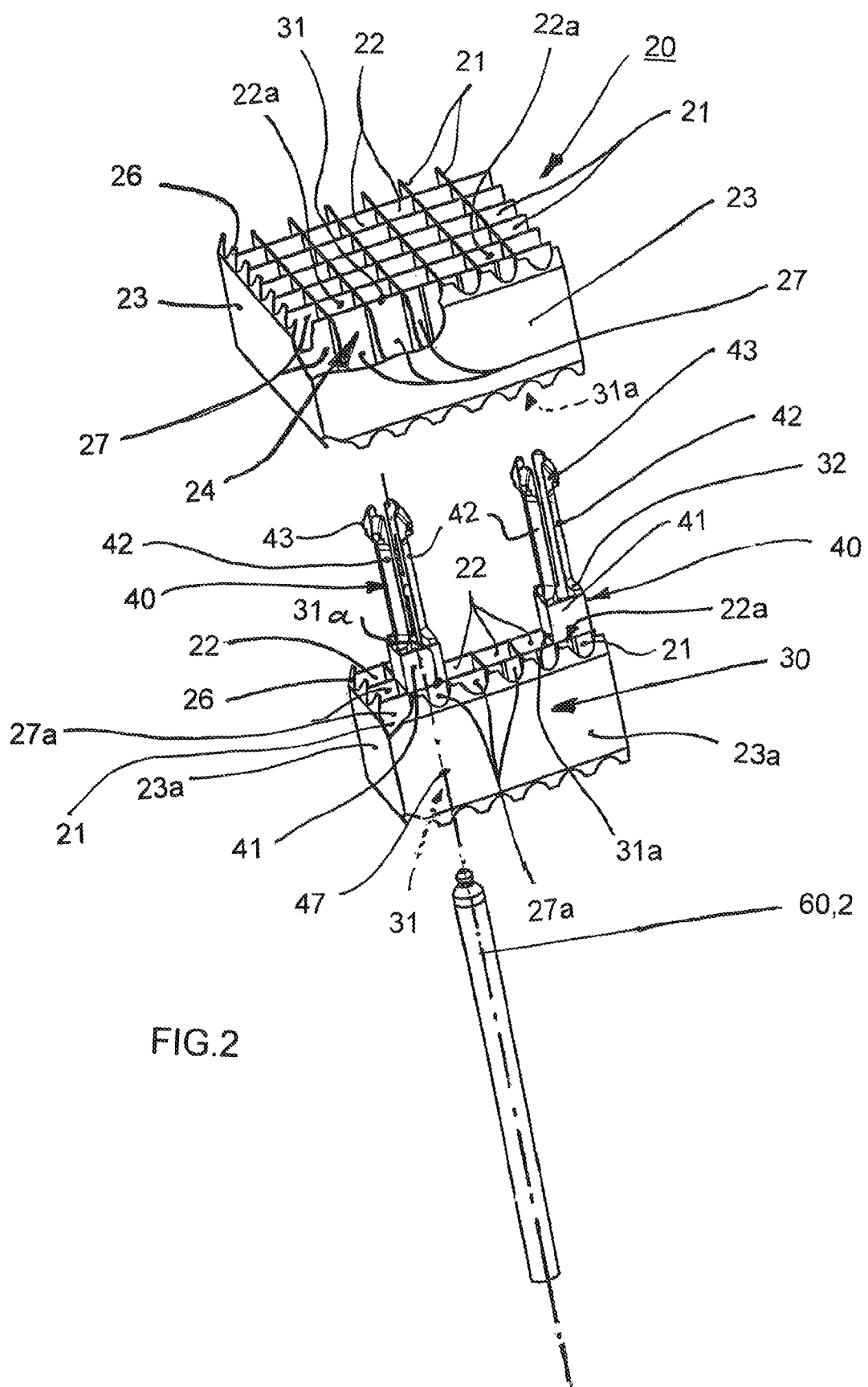
FIG. 2 is an exploded, perspective detailed view of a spacer with a damaged region, a replacement assembly with connecting parts, and a dummy fuel rod.
Figure 3:
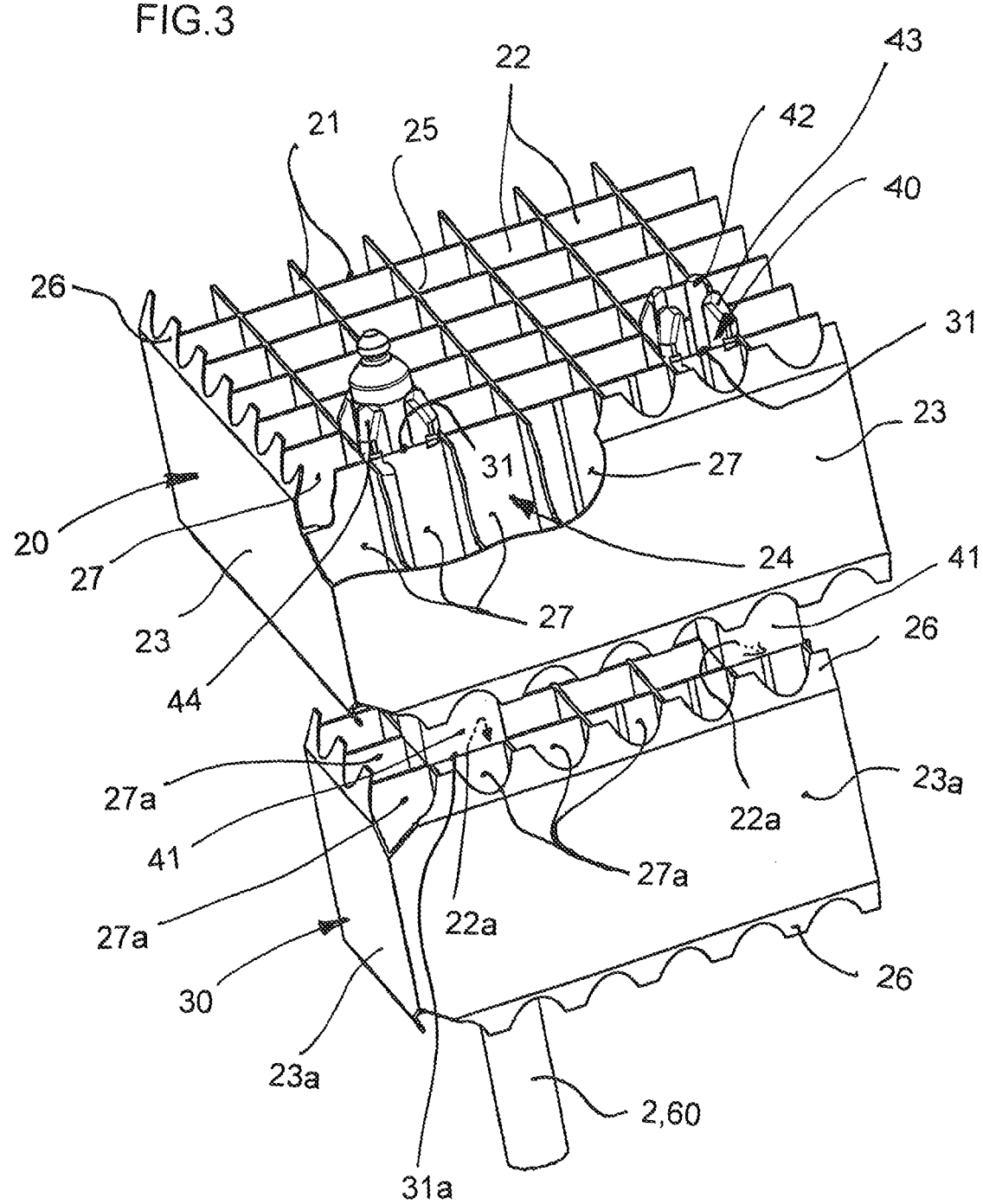
FIG. 3 is a perspective view of the parts shown in FIG. 2 when assembled.

FIGS. 2 and 3 show a section of the spacer 20 and a replacement assembly 30 with two connecting parts 40. The spacer 20 is formed of a multiplicity of square cells 22, which are formed by crossed webs 21 and are respectively axially traversed, that is to say traversed in the direction of the central longitudinal axis 6 of the fuel assembly, by a fuel rod 2 (omitted in FIGS. 2 and 3 for reasons of simplification). An outer edge of the spacer 20 is formed by outer webs 23. Flow vanes 26 are formed integrally on the upper and lower edge of the outer webs 23. When "above" and "below" are spoken of here and below, reference is made to the installed state of the fuel assembly. In a damaged region 24, for example, two outer webs 23 interconnected via the corners are damaged, and a few cells 27 directly adjoining at the edge, specifically at the outer webs 23, are damaged such that proper holding, above all holding free from vibration, of a fuel rod 2 is no longer ensured. This picture of damage is the basis of the further description. However, also conceivable is damage to cells lying further inside and not directly adjacent to the outer web 23.

The function of the defective cells 27 is taken over by a replacement assembly 30, which is fixed on the underside of the spacer with the aid of two connecting parts 40 with an axial spacing (FIG. 3). The replacement assembly 30 is a subregion separated out from a spacer of identical configuration to the damaged spacer 20, and contains two outer webs 23a interconnected via the corners, and in each case a first row of cells bordering the outer webs and a further second row of cells adjoining radially inward. The first row contains at least a number of replacement cells 27a that corresponds to the number of the damaged cells 27 of the damaged region 24. In the case illustrated, the damaged region 24 contains five defective cells 27, the first cell row of the replacement assembly 30 including a total of eight cells, of which 5 are replacement cells 27a. The second cell row of the replacement assembly 30 contains six cells 22, two of them serving as assembly cells 22, that is to say for the purpose of fixing a connecting part 40. The replacement assembly 30 is aligned in the array of the spacer 20 such that its replacement cells 27a are congruent with the defective cells 27 of the spacer 20 and its outer webs 23a are flush with the outer webs 23 of the spacer 20 in an axial fashion, that is to say in the direction of the central longitudinal axis 6 of the fuel assembly. The connecting parts 40 serving for fixing the replacement assemblies 30 on the spacer 20 interact, on the one hand, with an assembly cell 22a of the replacement assembly 30 and, on the other hand, with a corresponding assembly cell 22a of the spacer 20 in the manner of a snap connection, the assembly cells 22a of the spacer 20 not being damaged cells.

Figure 4:
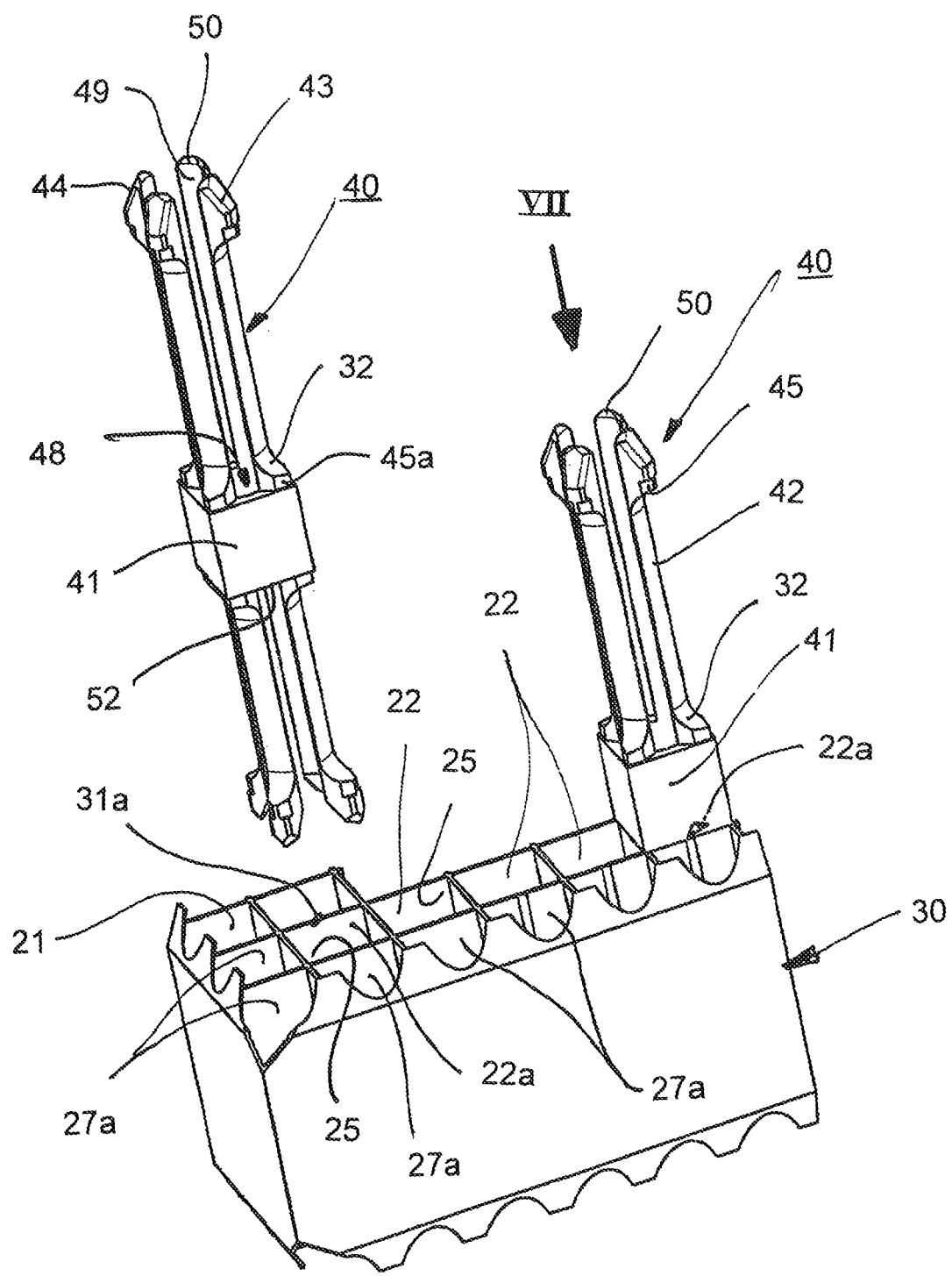
FIG. 4 is a perspective view of a replacement assembly with two connecting parts.
Figure 6:
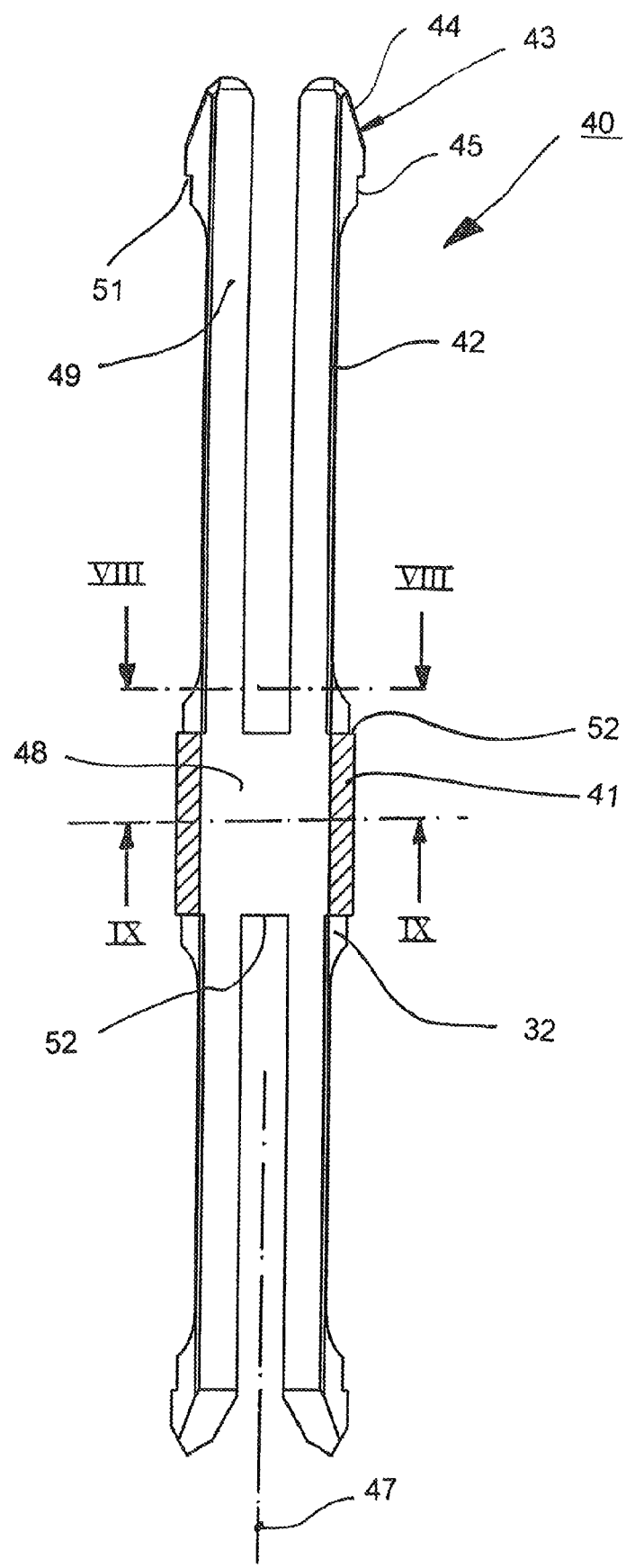
FIG. 6 is a longitudinal sectional view of the connecting part.

As is best to be gathered from FIGS. 4 and 6, the connecting part 40 is composed of a spacer piece 41, configured as padding, and, for example, eight spring tongues 42. The spacer piece 41 is penetrated by a central opening 48 that extends axially and whose diameter is chosen such that it can hold a fuel rod 2 or a dummy fuel rod 60 in a fashion substantially free from play. Four spring tongues 42 distributed equally in the circumferential direction respectively project in the direction of a central longitudinal axis 47, running parallel to the central longitudinal axis 6 of the fuel assembly, of the connecting part 40 from the end surfaces of the spacer piece 41, which extend at right angles to the central longitudinal axis 6 of the fuel assembly 1 and which form a stop surface 52—explained further below. The spring tongues 42 are of substantially strip-shaped configuration, their inner surfaces 49 facing the central longitudinal axis 47, being curved in accordance with the circumferential surface of a fuel rod 2, and being against the latter in the assembled state. The free ends of the spring tongues 42 are respectively provided on the outside with a latching projection 43 that has two radial shoulders 51 and an insertion bevel 44 for facilitating the plugging in of the spring tongues 42 into an assembly cell 22a. Furthermore, two stop surfaces 45 adapted to the corner region 25 of a cell 22a that is to say running at right angles to one another in the direction of the central longitudinal axis 47 of the connecting part 40, are present on the latching projection 43. The stop surfaces 45 respectively adjoin a radial shoulder 51, the radial shoulder 51 and the stop surface 45 forming a right angle with one another.

The procedure for repairing a fuel assembly 1 having a picture of damage of the type under discussion with the aid of one or more manipulators is preferably as follows: a defective fuel assembly 1 is removed from the reactor core, brought into a spent fuel storage tank and rotated such that the fuel assembly foot is accessible and can be dismounted. After the dismounting of the latter, the fuel rods 2 penetrating a damaged region 24 are withdrawn from the fuel rod cluster 3. The outer webs 23 of the spacer 20 are, if appropriate, deburred in the damaged region 24 and aligned such that they do not protrude beyond the normal plan area or width across flats of a spacer 20. A replacement assembly 30 adapted to the damaged region 24 is positioned on one or the other flat side, or—referred to the assembled state—above or below the spacer 20 such that in each case a damaged cell 27 is axially assigned a replacement cell 27a of the replacement assembly 30. In the replacement assembly 30, connecting parts 40 are fixed in at least two assembly cells 22a, the spring tongues 42 of the connecting parts traversing the assembly cells 22a, and the latching projections 43 present at their free ends engaging behind the end edges 31 (covered in the illustrations) facing them on the webs 21 of the replacement assembly 30. The replacement assembly 30 thus prepared is then made to approach the spacer 20 in an axial fashion, the spring tongues 42 which project in the direction of the spacer 20, being pushed into its assembly cells 22 until—as already described above—their latching projections 43 engage behind the end edges 31, facing them, of the webs 21. Further manipulations for fixing the replacement assembly 30 on the spacer 20 are not required. The fuel rods previously removed—or at least a portion thereof—are inserted into the fuel assembly 1 such that they respectively traverse a damaged cell 27 and a replacement cell 27a axially assigned to it, of the replacement assembly 30.

Figure 7:
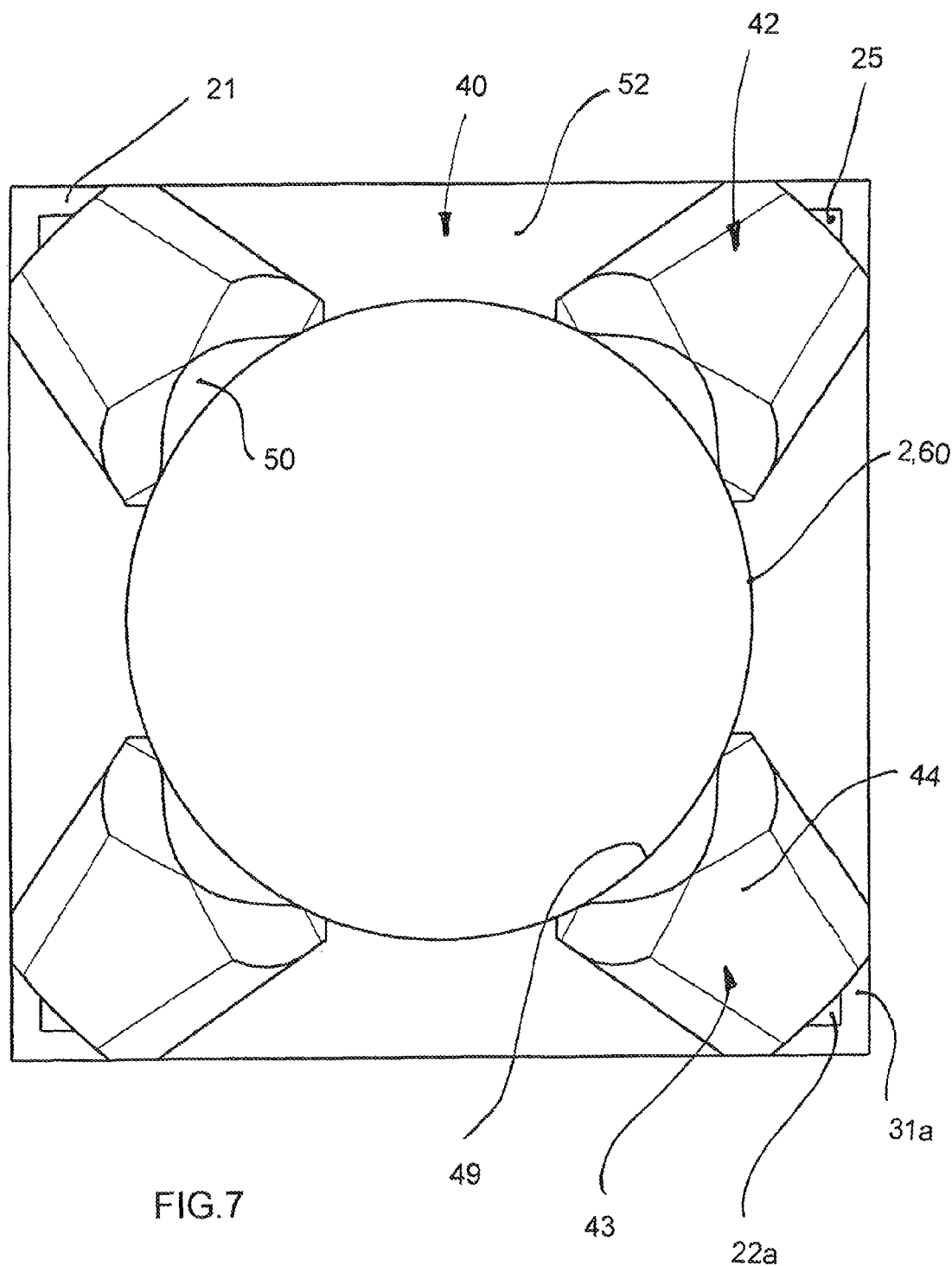
FIG. 7 is a top plan view of a cell of a replacement assembly with connecting part plugged therein, in the direction of the arrow VII shown in FIG. 4.
Figure 8:
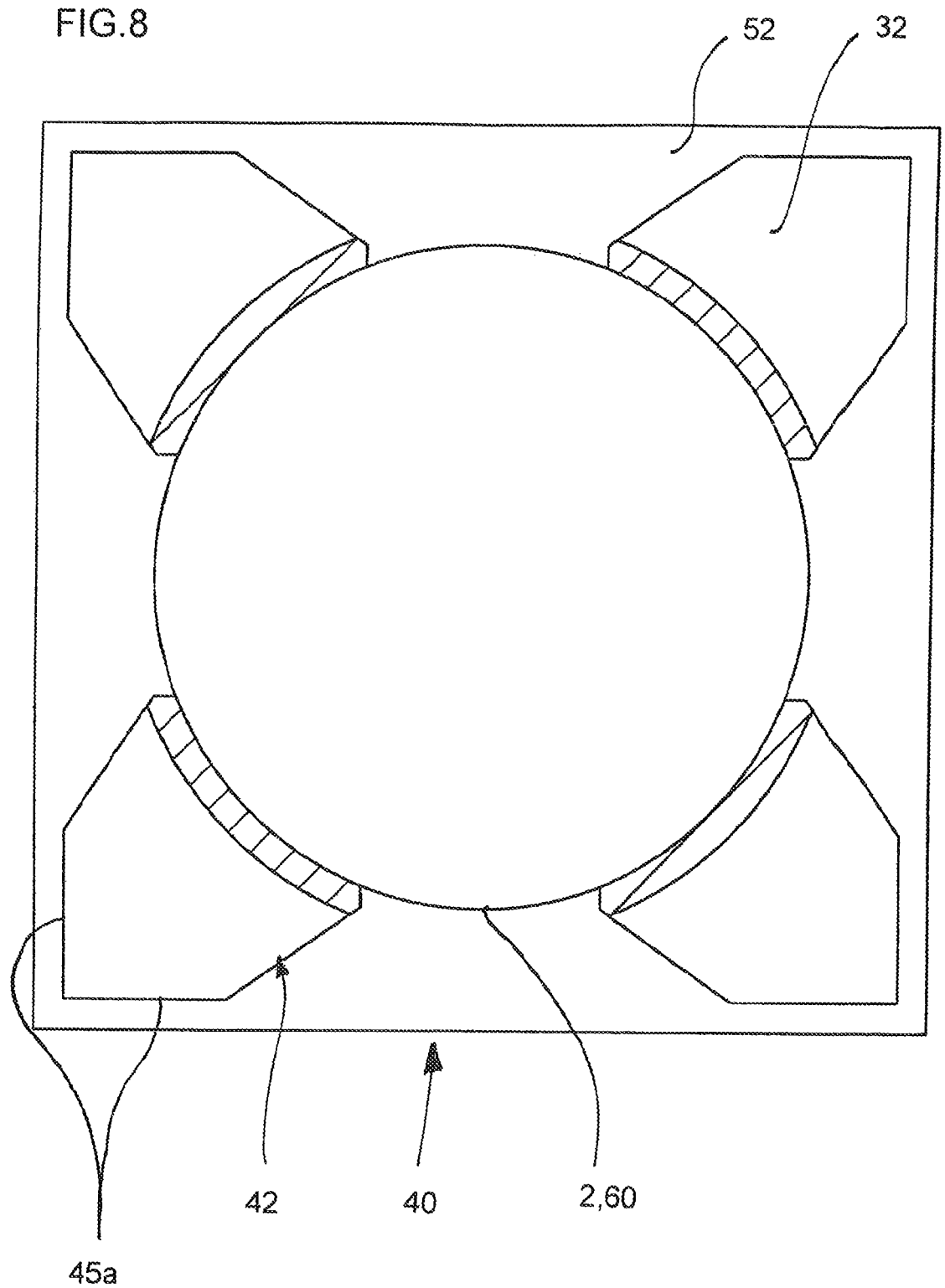
FIG. 8 is a cross-sectional view through the connecting part taken along line VIII-VIII shown in FIG. 6.
Figure 9:
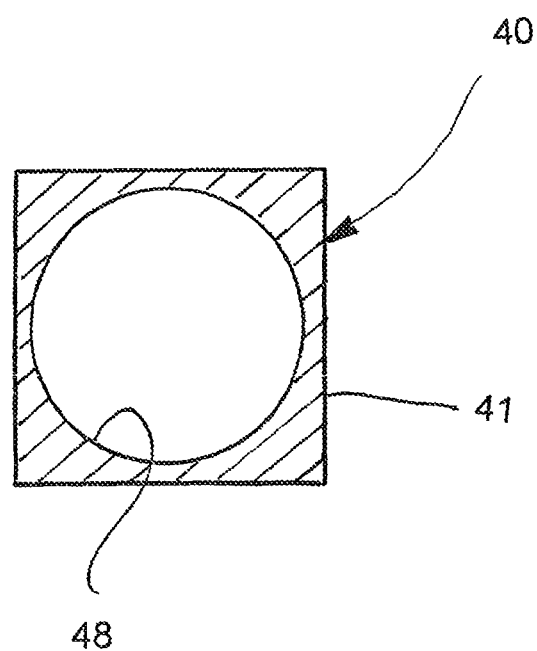
FIG. 9 is a cross-sectional view through the middle part or the spacer piece of a connecting part taken along the line IX-IX shown in FIG. 6.

In the assembled state produced in the way outlined, the stop surfaces 45 of the latching projections 43 bear against the respective corner regions 25 of an assembly cell 22a, as a result of which the connecting part 40 is reliably protected against rotating in relation to the spacer 20 or the replacement assembly 30. The radial shoulders 51 engaging behind the end edges 31 of the webs 21, and the regions of the latching projectors 43 supporting the radial shoulders are dimensioned such that the latching projections do not project into neighboring cells 22, or project in only so far (see FIG. 7, in particular) that these cells can be traversed by a fuel rod 2 without hindrance.

Figure 5:
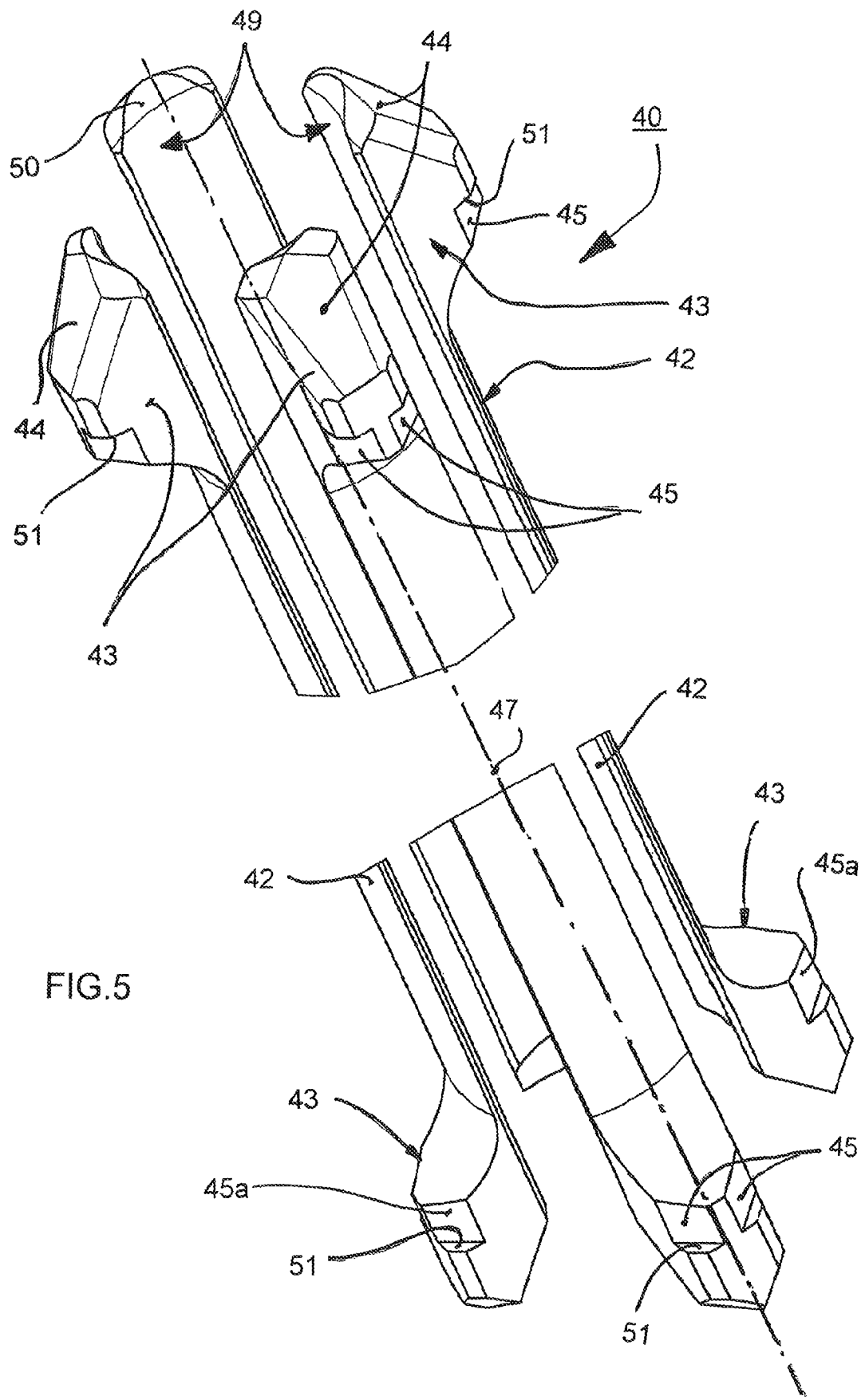
FIG. 5 is a perspective view of spring tongues of a connecting part in an enlarged illustration.

In the assembled state, the spacer piece 41 maintains a prescribed axial distance between the spacer 20 and replacement assembly 30. The end edges 31a, averted from the respective latching projections 43, of the webs 21 in this case bear against the end surfaces 52, extending at right angles to the central longitudinal axis 47 of the connecting part 40, of the spacer piece 41. The axial distance between the end surfaces 52 and the radial shoulders 51 of the latching projections corresponds to the height of the web 21. In a way similar to the case of the latching projections, there are likewise present on the base 32, extending radially outward, of the spring tongues 42 two stop surfaces 45a (see FIG. 5) that enclose a right angle, are situated in a corner region 25 of an assembly cell 22a, and additionally ensure that the connecting part 40 is protected against rotating in relation to the spacer 20 or the replacement assembly 30.

The spacer piece 41 is traversed by an opening 48. A fuel rod 2 can be inserted into this opening. However, the spacer piece embracing the fuel rod practically without play prevents access by primary coolant, or certainly restricts it so strongly that a fuel rod can be inserted into a connecting piece 40 only when this involves the uppermost spacer 20 that is disposed in the region of the plenum of the fuel assembly. The plenum forms the upper end of a fuel rod 2 and contains no nuclear fuel, and so there is no need for cooling or for dissipating the decay heat. Instead of a fuel rod 2, a dummy fuel rod 60 can be inserted into a connecting part 40 in the case of all other spacers 20. This ensures flow conditions such as correspond to the original, undamaged fuel assembly. A fuel rod 2 inserted into a connecting part 40 or a dummy fuel rod 60 keep the spring tongues 42 in their assembled position, in which they engage with their latching projections 43 behind the end edges 31a of the webs 21 such that a reliable connection is ensured between the spacer 20 and replacement assembly. In order to facilitate the insertion of a fuel rod 2 or a dummy fuel rod, insertion bevels 50 pointing toward the central longitudinal axis 47 are present on the latching projections 43.

Figure 10:
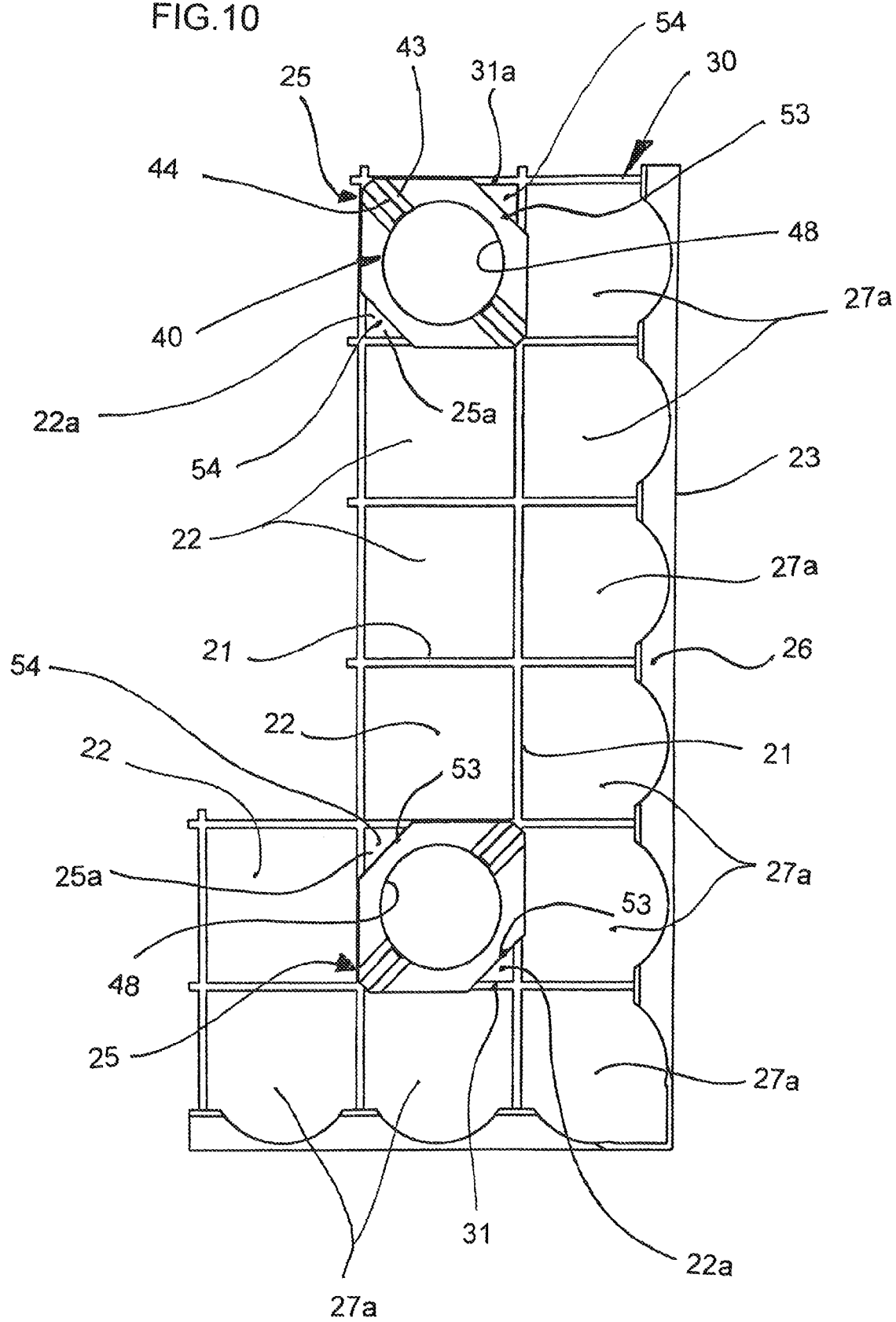
FIG. 10 is a top view of a replacement assembly with alternatively fashioned connecting parts.

FIG. 10 shows a replacement assembly 30 with connecting parts 40a that have two spring tongues 42, the latter being diametrically opposite one another and respectively operating with a corner region 25 of an assembly cell 22a. The other two corner regions 25a are free, and so it may be expedient, for example, for reasons of fluid flow, for the spacer piece 41a to have lateral oblique surfaces 53 diametrically opposite one another, and thus for a flow channel 54 to remain free in the respective corner regions 25a.

The invention claimed is:

1. A fuel assembly for a light water reactor, comprising:
    a fuel rod cluster having fuel rods;
    a spacer having webs defining a number of cells for laterally holding said fuel rods, said spacer further including an edge region having a damaged region with at least one damaged cell;
    at least one separate connecting part having a first end and a second end; and
    a replacement assembly being fastened selectively above or below, said damaged region of said spacer having said at least one damaged cell, with an aid of said at least one connecting part, said spacer and said replacement assembly each being respectively connected to said connection part in a manner of a snap connection, said replacement assembly having webs defining a number of replacement cells corresponding to a number of said damaged cells, at least a portion of said damaged cells being traversed by said fuel rods, said first end of said connecting part engaging in said spacer and said second end of said connecting part engaging in said replacement assembly for connecting said replacement assembly to said spacer;
    said webs of said spacer and said replacement assembly having end edges; and
    said connecting part containing axially extending spring tongues having latching projections each with a radial shoulder, at least one of said axially extending spring tongues penetrating a respective one of said cells of said spacer and at least another of said spring tongues penetrating a respective one of said replacement cells of said replacement assembly, said axially extending spring tongues bearing, at a free end protruding from said respective cell and said respective replacement cell, one of said latching projections, said latching projection engaging with said radial shoulder behind a respective end edge facing said latching projection.

2. The fuel assembly according to claim 1, wherein said connecting part has at an axial distance corresponding to a height of a respective web a stop surface, averted from said latching projection, for engaging behind said respective end edge of said respective web.

3. The fuel assembly according to claim 2, wherein said connecting part includes a spacer piece having an end surface extending at right angles to a central longitudinal axis of the fuel assembly, said stop surface being formed from said end surface, said spring tongues formed on said end surface.

4. The fuel assembly according to claim 1, wherein said connecting part has at least two further stop surfaces interacting with diametrically opposite regions of said respective cell and said respective replacement cell and are adapted to a cell shape.

5. The fuel assembly according to claim 4, wherein said stop surfaces are formed on at least one of said latching projection and a base of said extending spring tongues.

6. The fuel assembly according to claim 1, wherein said latching projections have insertion bevels interacting with said end edges of said webs.

7. The fuel assembly according to claim 1, wherein said cells and said replacement cells are angular cells, said axially extending spring tongues respectively penetrating a corner region of a respective angular cell.

8. The fuel assembly according to claim 1, wherein said connecting part has a cavity formed therein through which one of said fuel rods passes.

9. The fuel assembly according to claim 8, wherein said fuel rods include dummy fuel rods.

10. The fuel assembly according to claim 9, wherein said connecting part has spring tongues with inner sides, facing a central longitudinal axis of the fuel assembly, and configured in a complementary fashion to a cylindrical surface of said fuel rods and of said dummy fuel rods.

* * * * *